United States Patent
Kane et al.

(10) Patent No.: US 6,877,108 B2
(45) Date of Patent: Apr. 5, 2005

(54) METHOD AND APPARATUS FOR PROVIDING ERROR ISOLATION IN A MULTI-DOMAIN COMPUTER SYSTEM

(75) Inventors: Donald Kane, San Diego, CA (US); Steven Fitzgerald Weiss, San Diego, CA (US); Eric E. Graf, Hillsboro, OR (US); Andrew E. Phelps, Encinitas, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 611 days.

(21) Appl. No.: 09/963,082

(22) Filed: Sep. 25, 2001

(65) Prior Publication Data

US 2003/0061538 A1 Mar. 27, 2003

(51) Int. Cl.[7] ................................ G06F 11/00
(52) U.S. Cl. ................................ 714/4; 714/8
(58) Field of Search ................ 714/4, 8, 3, 5

(56) References Cited

U.S. PATENT DOCUMENTS

| | | | |
|---|---|---|---|
| 5,253,342 A | | 10/1993 | Blount et al. |
| 5,297,265 A | | 3/1994 | Frank et al. |
| 5,394,554 A | * | 2/1995 | Elko et al. ............ 709/224 |
| 5,721,828 A | | 2/1998 | Frisch |
| 5,918,229 A | | 6/1999 | Davis et al. |
| 6,332,180 B1 | | 12/2001 | Kauffman et al. |
| 6,571,360 B1 | * | 5/2003 | Drogichen et al. ........ 714/44 |
| 6,636,929 B1 | * | 10/2003 | Frantz et al. ............ 710/313 |
| 6,748,474 B1 | * | 6/2004 | Caldara et al. .......... 710/301 |
| 2002/0144193 A1 | * | 10/2002 | Hicks et al. ............ 714/48 |

FOREIGN PATENT DOCUMENTS

| | | |
|---|---|---|
| EP | 0 899 659 | 8/1998 |
| WO | WO 01/11468 | 2/2001 |

* cited by examiner

*Primary Examiner*—Scott Baderman
*Assistant Examiner*—Joshua Lohn
(74) *Attorney, Agent, or Firm*—Meyertons Hood Kivlin Kowert & Goetzel, P.C.; B. Noël Kivlin

(57) ABSTRACT

A method and apparatus for providing error isolation in a multi-domain computer system. The system includes a plurality of system resources allocated to form at least a first and second domain. The system resources of the first domain perform a set of transactions independent from a set of transactions performed by the system resources of the second domain. The system further comprises at least one interface for coupling one system resource from the first domain and one system resource from the second domain. The at least one interface tracks the set of transactions performed by the one system resource of the first domain and the one system resource of the second domain independently from one another.

22 Claims, 5 Drawing Sheets

METHOD AND APPARATUS FOR PROVIDING ERROR ISOLATION IN A MULTI-DOMAIN COMPUTER SYSTEM

BACKGROUND OF THE INVENTION

1. Field of the Invention

This invention relates generally to computer systems, and, more particularly, to a method and apparatus for providing error isolation in a multi-domain computer system.

2. Description of the Related Art

Network computing has increased dramatically over the past several years due in part to the emergence of the Internet. Some trends in the industry include a significant growth in Applications Service Providers (ASPs) that provide applications to businesses over networks that use the Internet to distribute product data to customers, take orders, and enhance communications between employees, for example.

Typically, businesses rely on network computing to maintain a competitive advantage over other businesses. As such, developers typically take several factors into consideration to meet the customer's expectation when designing processor-based systems for use in network environments. Such factors, for example, may include functionality, reliability, scalability and the performance of these systems.

One example of a processor-based system used in a network environment is a mid-range server system. A single mid-range server system may be configured for a plurality of operating domains, where a domain may act as a separate machine by running its own instance of an operating system to perform one or more of the configured tasks.

The benefits of providing near-independent operating domains within an integrated system are readily apparent as customers are able to perform a variety of tasks that would otherwise be reserved for several different machines. Because these operating domains typically share some of the computer system's resources, however, when one domain ceases to function properly it may adversely affect the operation of the other domain.

SUMMARY OF THE INVENTION

In one aspect of the present invention a method is provided, the method comprises allocating a plurality of system resources to form at least a first and second domain, the system resources of the first domain performing a set of transactions independent from a set of transactions performed by the system resources of the second domain. It is determined if an interface communicates with one system resource of the first domain and another system resource from the second domain. The set of transactions performed by the one system resource of the first domain and the one system resource of the second domain are tracked independently from one another providing that the interface communicates with at least the one system resource of the first domain and at least the one system resource of the second domain.

In another aspect of the present invention, a system is provided. The system comprises a plurality of system resources allocated to form at least a first and second domain. The system resources of the first domain perform a set of transactions independent from a set of transactions performed by the system resources of the second domain. The system further comprises at least one interface for coupling one system resource from the first domain and one system resource from the second domain. The at least one interface tracks the set of transactions performed by the one system resource of the first domain and the one system resource of the second domain independently from one another.

In another aspect of the present invention, an interface is provided. The interface couples to at least one system resource of a first domain and at least one system resource of a second domain, the first and second domains being independent from one another. The interface comprises a first logic for tracking the transactions of the one system resource of the first domain and a second logic for tracking the transactions of the one system resource of the second domain. The first logic tracks the transactions of the one system resource of the first domain and the second logic tracks the transactions of the one system resource of the second domain independently from one another.

BRIEF DESCRIPTION OF THE DRAWINGS

The invention may be understood by reference to the following description taken in conjunction with the accompanying drawings, in which like reference numerals identify like elements, and in which.

Figure 1:
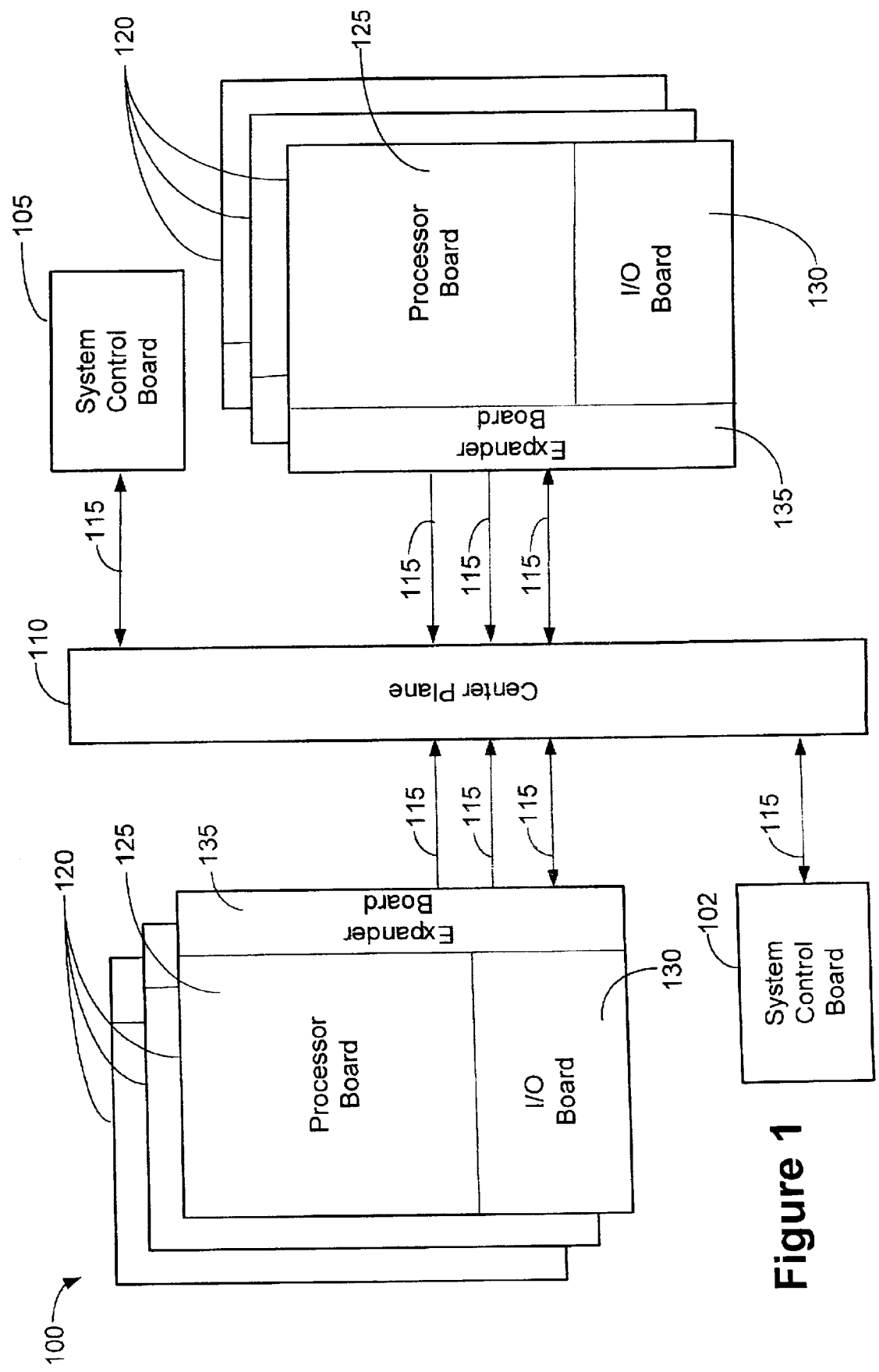
FIG. 1 illustrates a block diagram of a system for maintaining error isolation in a multi-domain computer network in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but, on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, and specifically referring to FIG. 1, a simplified block diagram of a system 100 for providing error isolation in a multi-domain computer network is shown according to one embodiment of the present invention. The system 100 comprises a pair of system control boards 102, 105 coupled to a center plane 110 (i.e., a communications medium controller) via communication links 115. In one embodiment, the communication links 115 take the form of edge connectors. It will be appreciated, however, that the communication links 115 may alternatively take the form of cables or various other types of interfaces without departing from the scope of the present invention.

According to the illustrated embodiment, one of the system control boards 102 serves as the "main" system control board for providing system controller resources for the system 100 and managing the overall operation thereof. Another "secondary" system control board 105, which may be functionally and/or structurally identical to the main system control board 102, may serve as a backup for managing the system 100 if the main system control board 105 fails or is otherwise made unavailable.

The system 100 further includes a plurality of system board sets 120, which are coupled to the center plane 110 via the communication links 115. The system board sets 120 comprise one or more boards, which may include a processor board 125, an I/O board 130, and an expander board 135. The processor board 125, for example, may include a plurality of processors and memories for executing various computing tasks. The I/O board 130 may manage I/O cards, such as peripheral component interface (PCI) cards and optical cards that are installed in the system 100 for connection to various I/O devices (not shown).

According to the illustrated embodiment, the expander board 135 allows both the processor board 125 and I/O board 130 to interface with the center plane 110. In accordance with one embodiment, the system 100 may include up to a total of 18 expander boards 135, with each expander board 135 having a slot for accommodating a processor board 125 and an I/O board 130 for a total of 36 boards 125, 130. It will be appreciated that the expander board 135 may alternatively be configured to accommodate various arrangements of processor boards 125 and I/O boards 130. That is, the expander board 135 may be alternatively configured to accommodate two processor boards 125 or one processor board 125 and one I/O board 130 (as shown in FIG. 1), without departing from the scope of the present invention. Additionally, it will be appreciated that the system 100 may be configured with a greater or fewer number of boards 125, 130, 135 than provided in the example above without departing from the scope of the present invention.

The center plane 110 serves as a communication medium for the plurality of system board sets 120 and system control boards 102, 105 to communicate with one another. According to one embodiment, the center plane 110 takes the form of an 18×18 crossbar to accommodate communication between the 36 boards 125, 130. Accordingly, the center plane 110 may permit the two system control boards 102, 105 to communicate with each other or with other system board sets 120, as well as allow the system board sets 120 to communicate with each other.

In accordance with one embodiment of the present invention, the system resources (e.g., processor boards, I/O boards) of the system 100 may be dynamically subdivided into a plurality of system domains, where each domain may have a separate boot disk to execute a specific instance of an operating system, separate disk storage, network interfaces, and/or I/O interfaces. Each domain may essentially operate as a separate machine that performs a variety of user-configured services. For example, one or more domains may be designated as an application server, a web server, database server, etc. Alternatively, each domain may be allocated to a specific department within a company or organization. For example, one domain may be allocated to a marketing department and another domain may be allocated to an accounting department to accommodate their respective computing needs. Alternatively, the system 100 may be shared by a few smaller companies or organizations through a computer service company, where it would otherwise be impractical for any one company or organization to purchase and maintain the system 100. Thus, each such company or organization could be allocated a specific grouping of system resources from the system 100 (i.e., allocated a domain) for their individual use.

Figure 2:
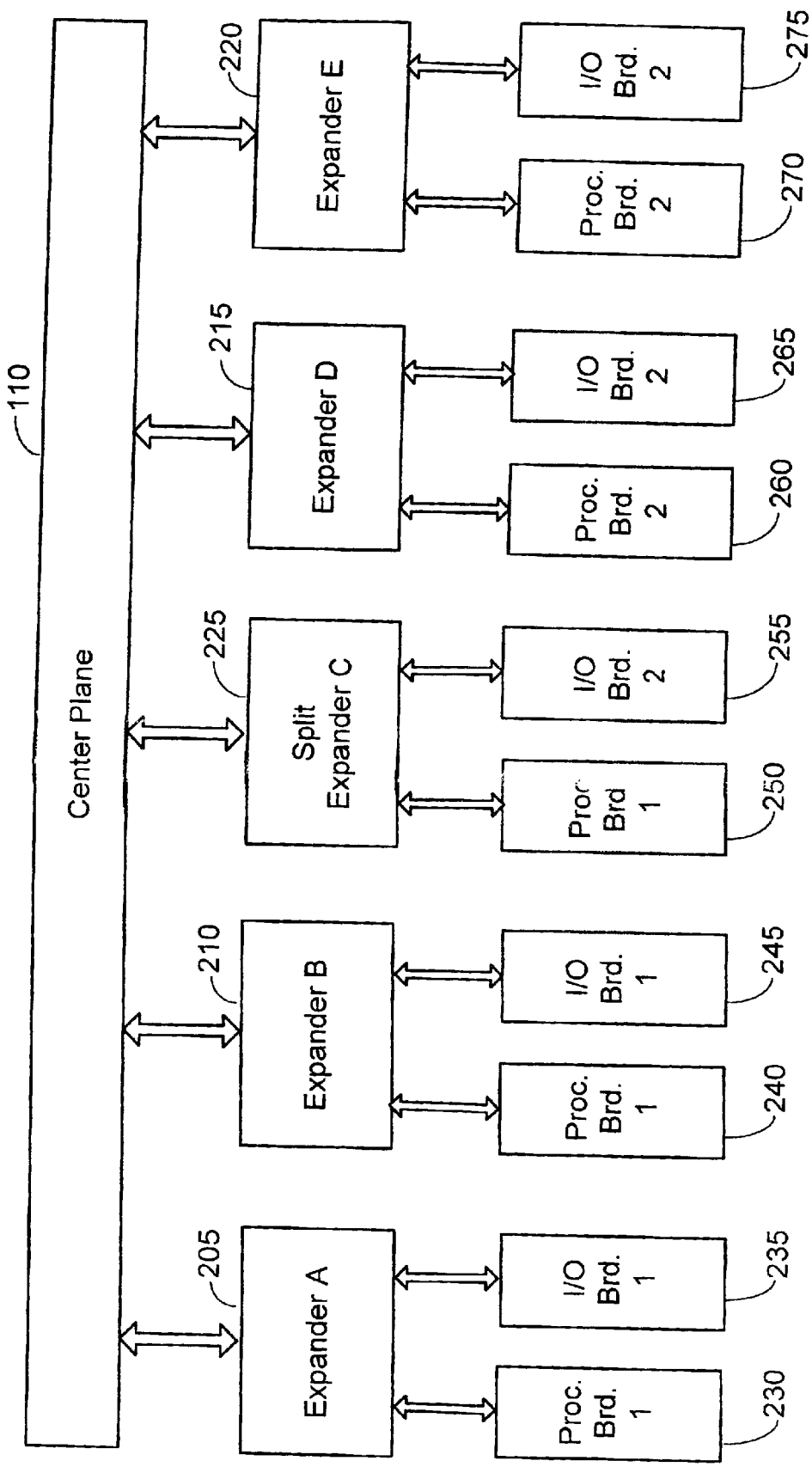
FIG. 2 shows a block diagram of an exemplary domain configuration, which may be employed in the system of FIG. 1, according to one embodiment of the present invention.

Turning now to FIG. 2, an example of a particular arrangement of the system 100 is shown in accordance with one embodiment of the present invention. According to this embodiment, the system resources of the system 100 are divided into two domains. The first domain is identified by the numeral "1," and the system resources (e.g., processor boards, I/O boards, etc.) that are allocated to the first domain are labeled accordingly. The second domain is identified by the numeral "2," and its corresponding grouping of system resources are labeled by the numeral "2."

As shown in FIG. 2, expander boards 205, 210 (i.e., expanders A and B) are each associated with processor boards 230, 240 and I/O boards 235, 245 that are allocated within domain 1. Expander boards 215, 220 (i.e., expanders D and E) are each associated with processor boards 260, 270 and I/O boards 265, 275 that are allocated within domain 2. As previously discussed, each domain defines a particular grouping of system resources within the system 100 to perform a particular task or set of tasks, which the domain is formed to accomplish. When the expander board 135 is interfaced with a processor board 125 and I/O board 130 within the same domain, it is referred to as a "non-split" expander or a "non-split" slot. In the particular example provided in FIG. 2, the expander boards 205, 210 and the expander boards 215, 220 are non-split expanders because they are interfaced with system resources from a single domain. For example, the expander boards 205, 210 respectively interface with the processor boards 230, 240 and the I/O boards 235, 245 from the same domain (i.e., domain 1). Likewise, the expander boards 215, 220 interface with the processor boards 260, 270 and the I/O boards 265, 275 from the same domain (i.e., domain 2). The expander board 225 (i.e., expander C), on the other hand, interfaces with system resources from differing domains. That is, the expander board 225 is interfaced with the processor board 250 from domain 1 and the I/O board 255 from domain 2. When the expander board 135 is interfaced with system resources from differing domains, it is referred to as a "split" expander or "split" slot. Accordingly, in the example provided in FIG. 2, the expander board 225 is a split expander.

A domain may be formed of an entire system board set 120, one or more boards (e.g., processor board 125, I/O board 130) from selected system board sets 120, or a combination thereof. Additionally, it will be appreciated that physical proximity of the boards is not necessary to be within a particular domain. It will further be appreciated that the number of domains need not necessarily be limited to two as shown in the example of FIG. 2, but may include several additional domains. For example, it is conceivable for each system board set 120 within the system 100 to form its own domain. It will also be appreciated that several other arrangements of the system resources may be formed, and, thus, need not be limited to the particular arrangement of system resources as illustrated in FIG. 2.

In accordance with the illustrated embodiment of the present invention, the system 100 is configured to perform intra-domain communication, i.e., communication solely within domain 1 and communication solely within domain 2, but not between domains 1 and 2. Typically, with intra-domain communication within the system 100, the transactions that occur in one domain on a non-split expander board do not affect the transactions that occur in the other domain because the expander board 135 interfaces solely with processor and/or I/O boards 125, 130 within one domain (i.e., either domain 1 or domain 2). Thus, the transactions for the processor board 250 (FIG. 2) of domain 1 and the I/O board 255 of domain 2 that are coupled to the split expander 225 are independent of one another, i.e., communication occurs solely between the system resources within domain 1 and solely between the system resources of domain 2. With the split expander board 225, however, intra-domain communication of one domain may be adversely affected if the other domain is "down" (i.e., has failed). That is, because the split expander board 225 handles transactions for both domains, if one domain goes down (such as domain 1, for example), it may adversely affect the operation of the other domain (i.e., domain 2) sharing the split expander board 225. Accordingly, if the system resources for one domain goes down, the system resources for the other domain may go down as well as a result of the two independent domains sharing the same expander board 135.

Figure 3:
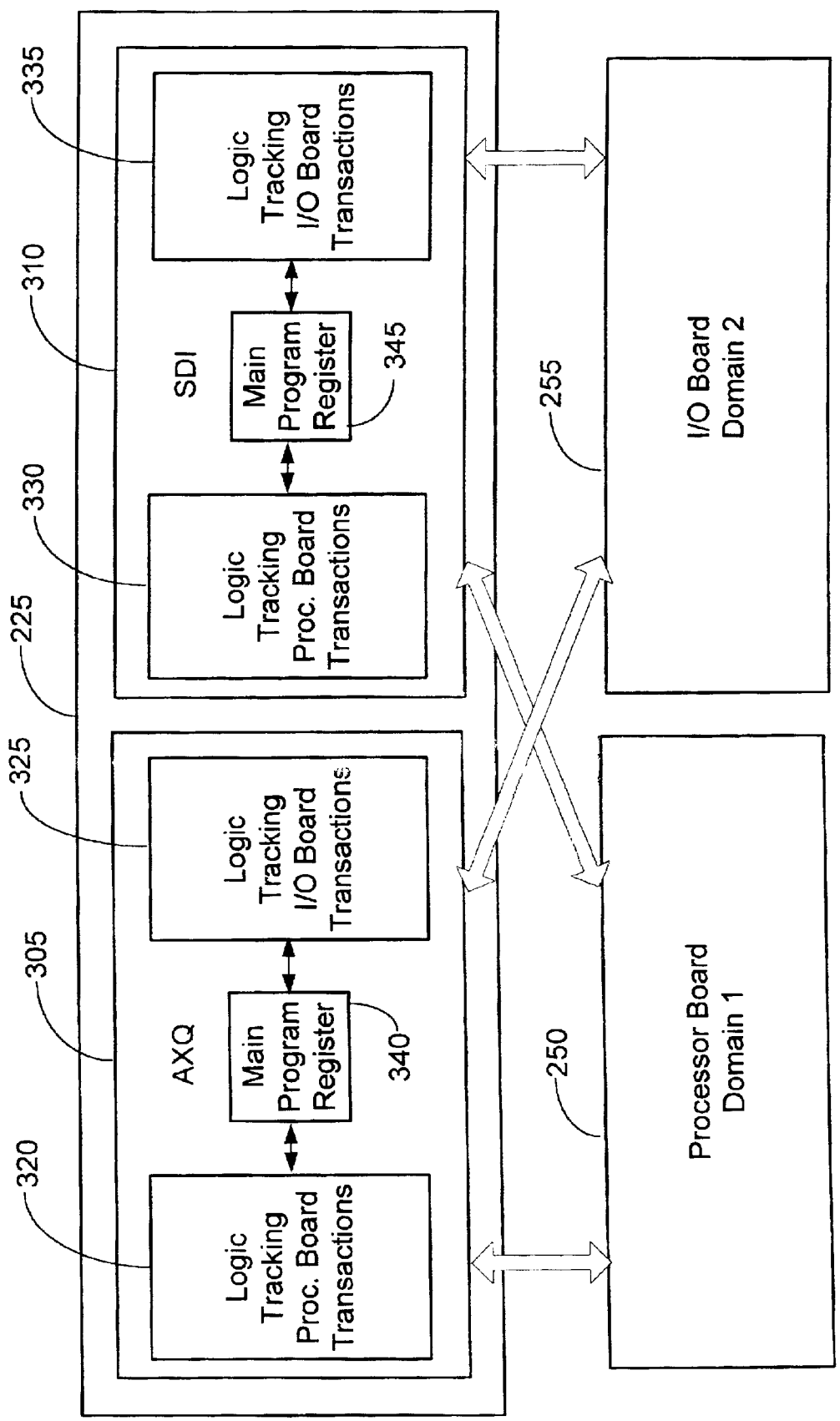
FIG. 3 is a more detailed representation of a split domain expander board that forms a part of the system shown in FIG. 2.

Turning now to FIG. 3, a more detailed representation of the split expander board 225 is shown in accordance with one embodiment of the present invention. The split expander board 225 receives transactions from the center plane 110 and directs transactions to the center plane 110 for the processor board 250 of domain 1 and the I/O board 255 of domain 2. In the illustrated embodiment, the transactions received from and transmitted to the center plane 110 include address, response and data transactions. An address transaction may include a request made by one system resource to another system resource within its own domain. For example, the processor board 250 (FIG. 2) of domain 1 may send an address transaction to the I/O board 235 of domain 1 to access data from a hard drive (not shown) associated with the I/O board 235. In response thereto, a data transaction would be performed to send the requested data from the I/O board 235 to the processor board 250. The expander board 205 would then send a response transaction to the expander board 225 indicating the completion of the data transaction.

According to the illustrated embodiment, the split expander board 225 is configured with an Address Expander Queue (AXQ) module 305 for processing the address and response transactions to and from the center plane 110 and the processor and I/O boards 250, 255. The split expander board 225 is further configured with a System Data Interface (SDI) module 310 for processing data transactions to and from the center plane 110 and the processor and I/O boards 250, 255. According to the illustrated embodiment, the AXQ module 305 is further configured with logic 320 to track all address and response transactions directed between the processor board 250 in domain 1 and the center plane 110. Similarly, all address and response transactions directed between the I/O board 255 in domain 2 and the center plane 110 are tracked by logic 325. The SDI module 310 is configured with logic 330 for tracking data transactions to and from the processor board 250 in domain 1 and the center plane 110. Logic 335 similarly tracks all data transactions between the I/O board 255 and the center plane 110. Accordingly, all transactions directed between the processor board 250 in domain 1 of the split expander 225 are tracked separately from all of the transactions directed between the I/O board 255 in domain 2. That is, the logic 320, 330 tracks the address, response and data transactions of the processor board 250 within domain 1, and the logic 325, 335 separately tracks all transactions occurring with the I/O board 255 in domain 2. Thus, all transactions to and from the split expander 225 are separately and independently maintained for each of the two domains the split expander 225 handles.

According to the illustrated embodiment, the AXQ module 305 and the SDI module 310 each further include a main programmable register 340, 345 (respectively) for directing all incoming and outgoing transactions to and from the split expander board 225. In accordance with one embodiment, the main programmable registers 340, 345 take the form of four 18-bit registers, which map the relationship between the processor boards and I/O boards within the system 100 relative to each of the processor board 250 and I/O board 255 of the split expander board 225. In the illustrated embodiment, the mapping information stored within the main programmable register 340 of the AXQ module 305 is identical to that of the main programmable register 345 of the SDI 310.

Figure 4:
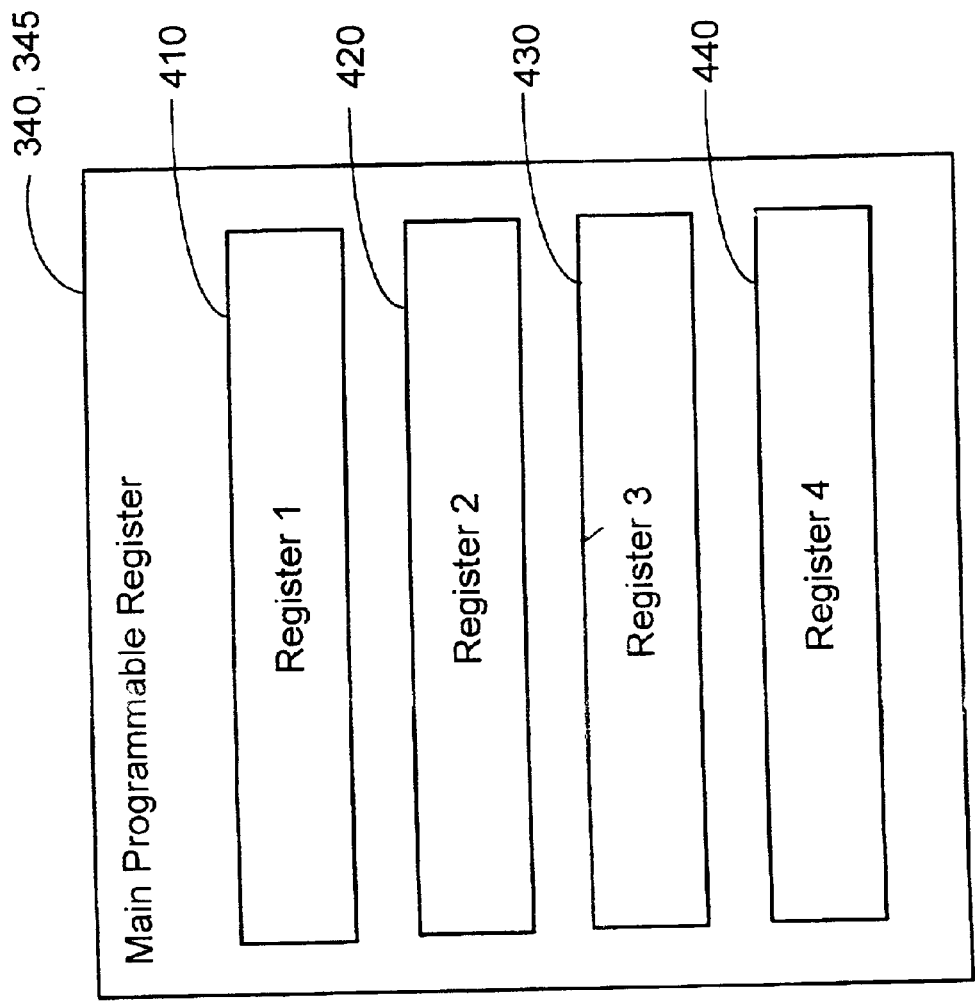
FIG. 4 is a more detailed representation of a main programmable register that forms a part of the split domain expander board of FIG. 3 according to one embodiment.

Referring to FIG. 4, the main programmable registers 340, 345 of the AXQ and SDI modules 305, 310 store this mapping information within four registers 410–440 according to one embodiment. The first register 410 indicates which of the processor boards of the system 100 are in the same domain as the processor board 250 of the split expander 225 as well as the expander boards with which they are coupled. The particular expander board coupled to each of the processor and I/O boards 125, 130 may be determined from the position of the bit within the register since there is one bit in each register that corresponds to each expander board of the system 100. In the example shown in FIG. 2, the processor boards 230, 240 of the expander boards 205, 210 are in the same domain as the processor board 250 of the split expander board 225. A second register 420 indicates which of the I/O boards within the system 100 are within the same domain as the processor board 250 of the split expander 225 as well as the expander board to which they are coupled. For example, (as shown in FIG. 2) the I/O boards 235, 245 of the expander boards 205, 210 are within the same domain as the processor board 250 of the split expander 225.

A third register 430 within the main programmable register 340, 345 indicates which of the processor boards are within the same domain as the I/O board 255 of the split expander 225. A fourth register 440 within the main programmable register 340, 345 indicates which of the I/O boards 130 within the system 100 are within the same domain as the I/O board 255 of the split expander 225. Accordingly, a mapping of the relationship between all the system resources (i.e., processor and I/O boards) within the system 100 as to the particular domain to which they belong and to which expander board they are coupled is established in the main programmable registers 340, 345.

When a particular transaction is originated within the system 100, an identifier of the expander board 135 coupled to the processor or I/O board 125, 130 originating the transaction is transmitted along with the transaction. When the transaction is received at the destination expander board, the transaction is directed to the AXQ module 305 or the SDI module 310 of the destination expander. If the transaction is an address or response transaction, it is directed to the AXQ module 305. Otherwise, if the transaction is a data transaction, it is directed to the SDI module 310. When the transaction is sent to the appropriate module 305, 310, the main programmable register 340, 345 will route the transaction to the appropriate logic 320, 325, 330, 335 based upon the mapping information stored therein.

As shown in FIG. 2, for example, if the processor board 270 of the expander board 220 sends an address transaction to the I/O board 255 of the split expander 225, the expander 220 (upon receiving the transaction from the processor board 270) routes the transaction to the split expander 225 via the center plane 110. Upon receiving the transaction from the center plane 110, the split expander 225 forwards the transaction to the AXQ module 305 because the transaction is an address transaction (otherwise the transaction would have been routed to the SDI 310 if it were a data transaction). It is then determined that the transaction originated from the expander 220 based upon the originating expander's identifier (i.e., expander 220) within the received transaction. Based upon the mapping information from the main programmable register 340, it is determined that the transaction originated from processor 270, which is in the same domain (i.e., domain 2) as the I/O board 255 of the split expander 225. Accordingly, the transaction is routed to the logic 325, which keeps track of all the transactions of the I/O board 255, and the transaction is recorded and then forwarded to the I/O board 255 for processing the received transaction. Thus, if a failure had occurred in domain 1, the transaction directed to the I/O board 255 of domain 2 may still be processed because its transactions are tracked independently and separately from the transactions that are directed to the processor board 250 of domain 1.

Figure 5:
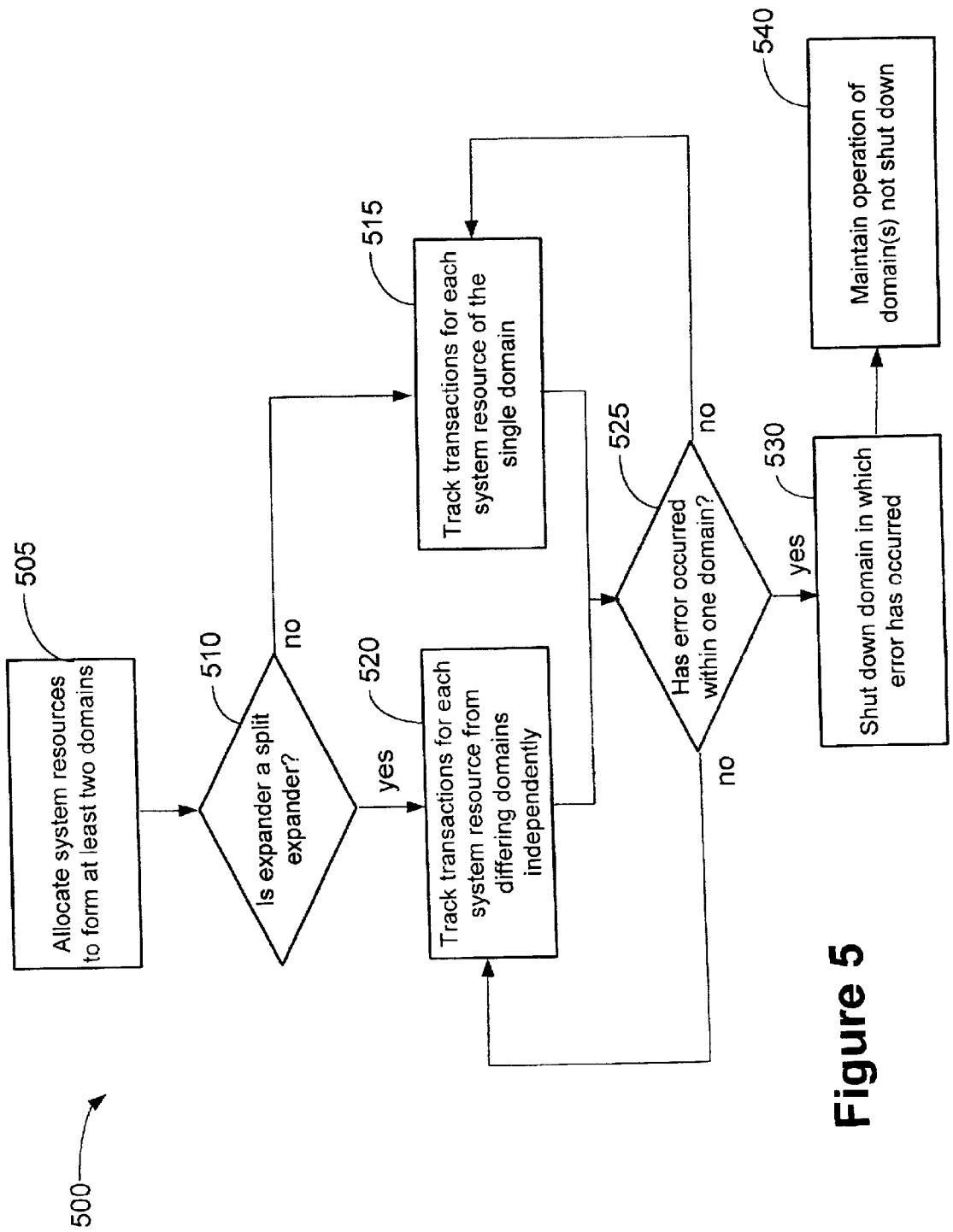
FIG. 5 shows a process for implementing error isolation in a multi-domain computer network in accordance with one embodiment of the present invention.

Turning now to FIG. 5, a process 500 is provided for maintaining error isolation within a multi-domain computer network according to one embodiment of the present invention. The process 500 commences at block 505 where a plurality of system resources of the system 100 are allocated to form at least two domains. In the illustrated embodiment, the system resources include the processor boards 125 and the I/O boards 130, which are allocated to the domains formed within the system 100. At block 510, the process 500 determines if any of the expander boards 135 in the system 100 are configured in a split expander mode (i.e., an expander 135 having two boards 125, 130 from differing domains). If the expander board 135 is operating in a non-split expander mode (i.e., where the two boards 125, 130 coupled to the expander 135 are from the same domain), the transactions of the boards 125, 130 coupled to the non-split expander are tracked for the single domain at block 515. If, on the other hand, it is determined that the expander board 135 is operating in a non-split mode, then the transactions for each of the boards 125, 130 that are coupled to the split expander 135 are tracked for each domain individually via the logic 320, 325 of the AXQ module 305 and the logic 330, 335 of the SDI module 335 at block 520.

At block 525, the center plane 110 determines whether an error has occurred within a domain of the system 100. If an error has not occurred with a domain of the system 100, the process 500 reverts back to either block 515 to track the transactions of a single domain for the non-split expander boards of the system 100 or to block 520 to track the transactions of each domain separately for the split expander board(s) of the system 100. If at block 525, it is determined that an error has occurred in a domain of the system 100, the center plane 110 shuts down the affected domain in which the error has occurred at bock 530. According to one embodiment of the present invention, the center plane 110 shuts down the non-split expander boards of the system 100 that are coupled to the boards 125, 130 of the domain in which the error had occurred, thereby shutting down the affected domain. It will be appreciated that several alternative functions may be performed in response to an error occurring within a domain. For example, the center plane 110 may be configured to disable communications, block communications, power down, provide an idle mode of operation, suspend transactions, etc. of the affected system resources.

At block 540, the process 500 maintains the operation of the domain(s) not shut down by permitting the non-split expander boards of the unaffected domain(s) to operate and permits the portion of the system resources of the split expander board(s) that were not affected by the domain that was shut down, to continue to track the transactions of the unaffected domain in a separate and independent manner.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:

allocating a plurality of system resources to form at least a first and second domain, the system resources of the first domain performing a first set of transactions independent from a second set of transactions performed by the system resources of the second domain;

determining if an interface has a system resource of the first domain and a system resource of the second domain interfaced therewith;

independently tracking utilizing the interface associated with the system resource of the first domain and transactions associated with the system resource of the second domain; and providing independent communication between the system resources of the first domain, and between the system resources of the second domain such that the first set of transactions is performed between the system resources of the first domain and the second set of transactions is performed between the system resources of the second domain.

2. The method of claim 1, further comprising: determining if an error has occurred within at least the first or second domain.

3. The method of claim 2, further comprising: shutting down the system resources belonging to the first or second domain in which the error occurred.

4. The method of claim 2, further comprising: continue tracking the transactions of the first or second domain in which the error has not occurred.

5. The method of claim 1, wherein tracking the first and second set of transactions performed by the system resource of the first domain and the system resource of the second domain further comprises: tracking the transactions for the system resources of the first domain wherein, the interface providing communication between the system resources of the first domain and not the system resources of the second domain.

6. The method of claim 1, wherein tracking the first and second set of transactions performed by the system resource of the first domain and the system resource of the second domain further comprises: tracking the transactions for the system resources of the second domain wherein, the interface providing communication between the system resources of the second domain and not the system resources of the first domain.

7. A system, comprising:

a plurality of system resources allocated to form at least a first and second domain, the system resources of the first domain performing a first set of transactions independent from a second set of transactions performed by the system resources of the second domain;

at least one interface for coupling a system resource from the first domain and a system resource from the second domain; and wherein the at least one interface independently tracks transactions associated with the system resource of the first domain and transactions associated with the system resource of the second domain; and wherein the interface provides independent communication between the system resources of the first domain, and between the system resources of the second domain such that the first set of transactions is performed between the system resources of the first domain and the second set of transactions is performed between the system resources of the second domain.

8. The system of claim 7, wherein the at least one interface further comprises: a first logic for tracking the transactions of the system resource of the first domain; and a second logic for tracking the transactions of the system resource of the second domain.

9. The system of claim 8, further comprising: a communications medium controller that couples the at least one interface to other interfaces; and wherein the communications medium controller further determines whether an error has occurred within one of the first and second domain.

10. The system of claim 9, wherein the at least one interface tracks transactions of the system resources of the first or second domain in which the error has not occurred.

11. The system of claim 9, wherein the at least one interface further comprises: a first module for tracking a first type of transactions performed by the system resource of the first domain and the system resource of the second domain; and a second module for tracking a second type of transactions performed by the system resource of the first domain and the system resource of the second domain; and wherein the first and second modules both include the first and second logic for tracking the first and second types of transactions respectively.

12. The system of claim 11, wherein the first and second modules each further comprise a register for mapping the relationship of the system resources of the at least one interface to other system resources of other interfaces coupled to the communications medium controller.

13. The system of claim 12, wherein the first or second module receives a transaction via the communications medium controller and directs the transaction to one of the first and second logic based on the mapping relationship in the register.

14. An interface for coupling system resources of a first domain and system resources of a second domain, the first and second domains being independent of one another, the interface comprising:

a first logic for tracking transactions associated with a system resource of the first domain; and a second logic for tracking transactions associated with a system resource of the second domain; and wherein the first logic tracks the transactions associated with the system resource of the first domain and the second logic tracks the transactions associated with the system resource of the second domain independently from one another.

15. The interface of claim 14, further comprising: a first module for tracking a first type of transaction performed by the system resource of the first domain and the system resource of the second domain; and a second module for tracking a second type of transaction performed by the system resource of the first domain and the system resource of the second domain; and wherein the first and second modules each include the first and second logic for tracking the first and second types of transactions respectively.

16. The interface of claim 15, wherein the first and second modules each further comprise a register for mapping the relationship of the system resources of the at least one interface to other system resources of other interfaces coupled to each other via a communications medium controller.

17. An article comprising one or more machine-readable storage media containing instructions that when executed enable a processor to:

allocate a plurality of system resources to form at least a first and second domain, the system resources of the first domain performing a first set of transactions independent from a second set of transactions performed by the system resources of the second domain;

determine if an interface has a system resource of the first domain and a system resource from the second domain interfaced therewith;

independently track utilizing the interface transactions associated with the system resource of the first domain and associated with the system resource of the second domain; and provide independent communication between the system resources of the first domain, and between the system resources of the second domain such that the first set of transactions is performed between the system resources of the first domain and the second set of transactions is performed between the system resources of the second domain.

18. The article of claim 17, further comprising: determining if an error has occurred within at least the first or second domain.

19. The article of claim 18, further comprising: shutting down the system resources associated with one of the first and second domain in which the error occurred.

20. The article of claim 18, further comprising: continue tracking the transactions of the first or second domain in which the error has not occurred.

21. The article of claim 17, wherein tracking the first and second set of transactions performed by the system resource of the first domain and the system resource of the second domain further comprises: tracking the transactions for the system resources of the first domain, wherein the interface provides communication between the system resources of the first domain and not the system resources of the second domain.

22. The article of claim 17, wherein tracking the first and second set of transactions performed by the system resource of the first domain and the system resource of the second domain further comprises: tracking the transactions for the system resources of the second domain, wherein the interface providing communication between the system resources of the second domain and not the system resources of the first domain.

* * * * *

UNITED STATES PATENT AND TRADEMARK OFFICE
CERTIFICATE OF CORRECTION

PATENT NO. : 6,877,108 B2
DATED : April 5, 2005
INVENTOR(S) : Kane et al.

It is certified that error appears in the above-identified patent and that said Letters Patent is hereby corrected as shown below:

Column 8,
Line 40, please delete "independently tracking utilizing the interface associated" and substitute -- independently tracking, utilizing the interface, transactions associated --.

Column 10,
Line 32, please delete "independently tracking utilizing the interface transactions" and substitute -- independently track, utilizing the interface, transactions --.

Signed and Sealed this

First Day of November, 2005

JON W. DUDAS
*Director of the United States Patent and Trademark Office*